(12) United States Patent
Kubota et al.

(10) Patent No.: US 8,244,460 B2
(45) Date of Patent: Aug. 14, 2012

(54) NAVIGATION SYSTEM

(75) Inventors: Tomoki Kubota, Okazaki (JP); Yumi Shibata, Okazaki (JP); Yukio Yamamoto, Okazaki (JP)

(73) Assignee: Aisin AW Co., Ltd. (JP)

( * ) Notice: Subject to any disclaimer, the term of this patent is extended or adjusted under 35 U.S.C. 154(b) by 1238 days.

(21) Appl. No.: 11/197,538

(22) Filed: Aug. 5, 2005

(65) Prior Publication Data

US 2006/0041372 A1 Feb. 23, 2006

(30) Foreign Application Priority Data

Aug. 6, 2004 (JP) ................. 2004-231146

(51) Int. Cl.
*G01C 21/00* (2006.01)
(52) U.S. Cl. ........ 701/408; 701/431; 701/432; 701/428; 701/455; 345/601; 345/441; 345/442; 345/443
(58) Field of Classification Search .......... 701/211, 701/201, 209, 208, 213, 408, 431, 432, 428, 701/455, 457; 340/995; 345/601, 441, 442, 345/443
See application file for complete search history.

(56) References Cited

U.S. PATENT DOCUMENTS

| | | | |
|---|---|---|---|
| 5,465,089 A | 11/1995 | Nakatani et al. | |
| 6,035,253 A * | 3/2000 | Hayashi et al. | 701/428 |
| 6,127,969 A | 10/2000 | Van Roekel | |
| 6,268,825 B1 * | 7/2001 | Okada | 342/357.52 |
| 2002/0055808 A1 * | 5/2002 | Matsumoto | 701/1 |

FOREIGN PATENT DOCUMENTS

| | | |
|---|---|---|
| DE | 19738764 A1 | 3/1999 |
| JP | 04-184215 | 7/1992 |
| JP | 08-086661 | 4/1996 |
| JP | 07-139959 | 6/1996 |
| JP | 09-035186 | 2/1997 |
| JP | 09-189565 | 7/1997 |
| JP | 11-0066284 | 3/1999 |
| JP | 2003-247835 | 9/2003 |
| JP | 2004-132897 | 4/2004 |
| JP | 2004-286683 | 10/2004 |
| JP | 2004286683 A * | 10/2004 |

* cited by examiner

*Primary Examiner* — Redhwan k Mawari
(74) *Attorney, Agent, or Firm* — Bacon and Thomas, PLLC (57) ABSTRACT

A navigation system presents and updates information that allows the driver to determine an appropriate vehicle speed and a steering angle depending on a condition or a feature of a road. The navigation system includes storage means for storing map data, a display for displaying information, a vehicle speed sensor for detecting a vehicle speed, and a controller for determining the shape of a road section being approached by a vehicle, based on the map data and the vehicle speed, and controlling the display to display the shape of the road.

17 Claims, 8 Drawing Sheets

SECTION LENGTH L: SMALL (L ≤ L1)

| CURVE SHAPE / LATERAL ACCELERATION | SLIGHT | MEDIUM | TIGHT |
|---|---|---|---|
| G2 ≦ G | A | B | C |
| G1 < G < G2 | D | E | F |
| G ≦ G1 | G | H | I |

FIG.6(a)

SECTION LENGTH L: MEDIUM (L1 < L < L2)

| CURVE SHAPE / LATERAL ACCELERATION | SLIGHT | MEDIUM | TIGHT |
|---|---|---|---|
| G2 ≦ G | J | K | L |
| G1 < G < G2 | M | N | O |
| G ≦ G1 | P | Q | R |

SECTION LENGTH L: LARGE (L2 ≤ L)

| CURVE SHAPE / LATERAL ACCELERATION | SLIGHT | MEDIUM | TIGHT |
|---|---|---|---|
| G2 ≦ G | S | T | U |
| G1 < G < G2 | V | W | X |
| G ≦ G1 | Y | Z | Z |

NAVIGATION SYSTEM

INCORPORATION BY REFERENCE

The disclosure of Japanese Patent Application No. 2004-231146 filed on Aug. 6, 2004, including the specification, drawings and abstract thereof, is incorporated herein by reference in its entirety.

BACKGROUND OF THE INVENTION

1. Field of the Invention

The present invention relates to a navigation system.

2. Description of the Related Art

A navigation apparatus installed in a vehicle such as a car is known to use a position detection apparatus called a GPS (Global Positioning System) and/or other sensors whereby information is provided to a driver, which information typically includes the current position of the vehicle and a route to a destination displayed on a screen.

Such a navigation apparatus is known to warn a driver when the vehicle is approaching a location, such as a curve, where safety is difficult to predict. A warning that the vehicle is approaching such a curve is given by a warning sound, by a change in the color of a road displayed on a map screen of a display, or by display of a warning symbol (as disclosed, for example, in Japanese Unexamined Patent Application Publication No. 9-35186 or Japanese Unexamined Patent Application Publication No. 9-189565).

However, the conventional navigation apparatus does not have the capability of providing appropriate information to a driver for travel on a difficult road, such as a mountain road which has a plurality of successive curves, changes in gradient, and/or poor visibility. When a road includes many successive curves, if a similar warning is displayed for all curves, the driver cannot distinguish a tight curve from a gentle (slight) curve, and the driver may be preoccupied with a warning for a slight curve, causing the driver to miss a warning for a tight curve. That is, important information may become lost in a relatively greater quantity of less important information.

When a vehicle runs on a difficult road such as a mountain road or the like, a driver needs to make various decisions, one after another, within a short time, relating, for example, to curvature, change in gradient, approach of another vehicle, etc., and thus the driver needs to concentrate all his/her energy on driving. Repeated pressing of the brake pedal, over/under steering, and/or other inappropriate driving operations can cause the vehicle to become unstable.

SUMMARY OF THE INVENTION

In view of the above-described problems, one object of the present invention is to provide a navigation system that properly provides, to the driver of a vehicle, information that allows the driver to determine a vehicle speed and/or steering angle appropriate for a condition or feature of the road, thereby reducing the burden imposed on the driver, especially in travel on a difficult road that requires the driver to make quick, successive decisions, and thus improving driving safety.

To achieve the above object, the present invention provides a navigation system including storage means for storing map data, a display unit for displaying information, a vehicle speed sensor for detecting vehicle speed, and a controller for determining the shape of a road section in advance of the vehicle, as the vehicle approaches that road section, based on the map data and the vehicle speed, and controlling the display unit to display the determined shape of the road section.

The present invention makes it possible to properly provide a vehicle with information that allows the driver to properly determine the vehicle speed and the steering angle in accordance with the road condition and/or features (characteristics), thereby reducing the burden imposed on the driver in traveling a difficult road that requires decisions in quick succession, thus ensuring driving safety.

BRIEF DESCRIPTION OF THE DRAWINGS

FIGS. 5($a$-1) through 5($c$-2) are one example of a set of graphs of a modification factor r for radius of curvature R versus turning acceleration G and a modification factor w for width W (see FIG. 4) versus turning acceleration G, utilized in determination of the shape of a road section according to one embodiment of the present invention.

FIGS. 6($a$) to 6($c$) are tables for shape determination of various road sections with curves as shown in FIG. 6($d$), according to another embodiment of the present invention.

FIGS. 7($a$) to 7($c$) illustrate another embodiment of shape determination for defining the shape of a road section.

DESCRIPTION OF THE PREFERRED EMBODIMENTS

Preferred embodiments of the present invention are described below with reference to the accompanying drawings.

Figure 1:
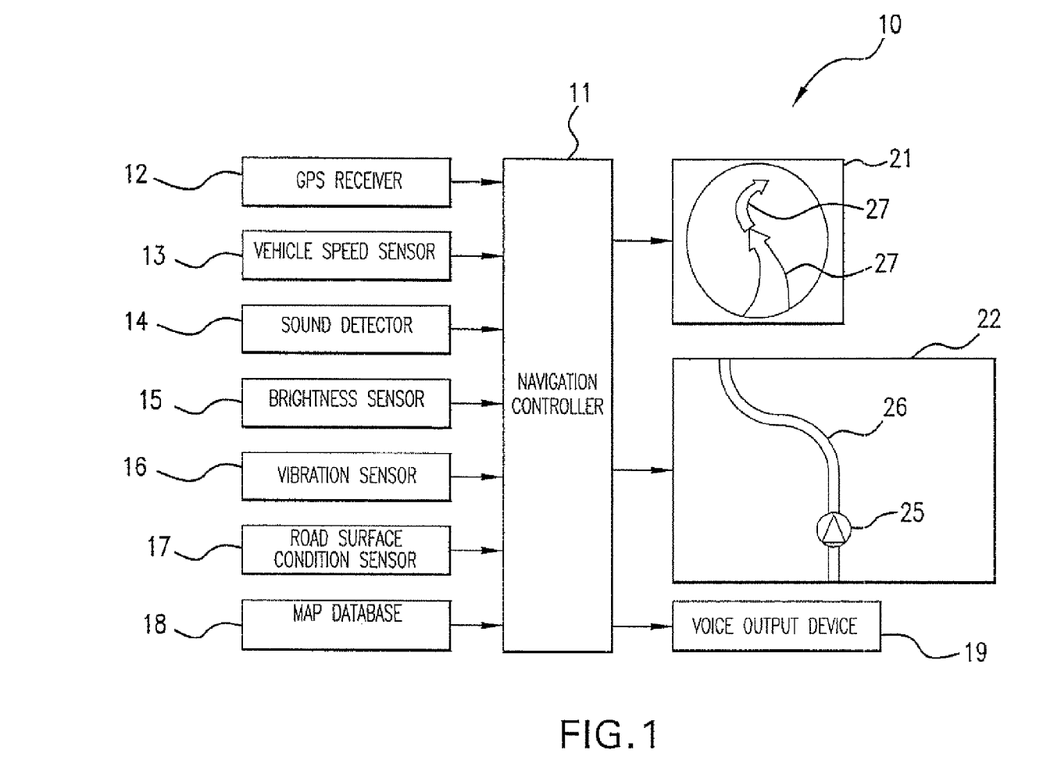
FIG. 1 is a block diagram of a navigation system according to an embodiment of the present invention.

FIG. 1 shows a navigation system 10, for use on a road vehicle such as a passenger car, truck, bus, motorcycle, service vehicle, etc., as including a computer system with computational processing means and storage means. In the navigation system 10, a navigation controller 11 serves as a controller that executes various routines (processes) including displaying of a map, detection of the current position of the vehicle, the basic navigation process including providing route guidance, determining the shape of a curve, etc. The GPS receiver 12 includes a GPS antenna similar to a conventional GPS receiver of the type widely used in navigation apparatus, and serves to receive GPS information transmitted from a GPS satellite and to supply the received GPS information to the navigation controller 11. A vehicle speed sensor 13 is a conventional vehicle speed sensor, and serves to detect the running speed of the vehicle, that is, the vehicle speed, and to transmit the detected vehicle speed to the navigation controller 11.

A sound detector 14 includes a microphone or the like, is disposed in a compartment of the vehicle to detect ambient sounds, such as wind noise or engine noise audible to a driver, and transmits the detected sound to the navigation controller 11. A brightness sensor 15, including a photosensor or the like, detects a change in ambient brightness, such as the change in brightness between day and night or a change in brightness depending on a change in location such as between a field or a mountainous area, and transmits detected brightness to the navigation controller 11. A vibration sensor 16 is disposed in an interior compartment of the vehicle and serves to detect vibration of the driver's seat or the like and to transmit the detected vibration to the navigation controller 11. A road surface condition sensor 17, including a CCD (Charge Coupled Device) or the like takes an image of the road surface ahead of the vehicle and serves to detect water on the surface of the road, for example based on the ratio of the horizontally polarized component to the vertically polarized component of light reflected from the road surface, that is, based on the polarization characteristic of the road surface, thereby detecting the surface condition such as dry, wet, snow covered, or ice covered.

A map database 18 includes map data such as search data and is stored in storage means. The map data recorded in the map database 18 includes, in addition to the search data used in searching for a route, facility data and other various data necessary for display on the screen of the display unit 22 (that will be described later), a guide map for following the route determined by the searching process and other guide information. The map database 18 includes an intersection data file, a node data file, a road data file, and a facility information data file in which various types of information about facilities such as hotels and service stations, correlated with their various locations, are recorded. More specifically, intersection data is recorded in the intersection data file, node data in the node data file, and road data in the road data file, and information associated with roads is displayed on the screen of the display unit 22 in accordance with the intersection data, the node data, and the road data. The intersection data includes data indicating the type of each intersection, that is, data for each intersection indicating whether or not it has a traffic signal. The node data indicates at least the position and the shape of each road included in the map data and recorded in the map database 18, and the node data includes data indicating each branch point (such as an intersection or a T junction), data indicating each node, and data indicating each link connecting adjacent nodes. The node data also indicates curves in a road.

The road data includes data indicating the characteristics of roads such as road width, gradients, cant, banking, the number of lanes, points at which the number of lanes decreases, and points at which the width decreases. In the case of an expressway or a trunk road, data for a set of lanes in one direction is stored as road data for one road and data for another set of lanes in the opposite direction is separately stored as data for another road, that is, each expressway or trunk road is treated as two roads or "a double road". More specifically, a trunk road having two or more lanes in each direction is regarded as a double road, and a set of inbound lanes and a set of outbound lanes are stored as separate road data. The road data also includes corner data indicating radius of curvature, an intersection, a T junction, and/or an entrance point into a curve or a turn at a corner. The road data further includes "road attributes", such as railroad crossings, expressway entrance/exit ramps, tollgates on an expressway, and road type.

A voice output device 19 including a loudspeaker is connected to the navigation controller 11 and serves to output, in the form of a voice, information associated with route guidance, information for a curve being approached by the vehicle, etc. The display unit 22 provides the main display and may be a CRT, a liquid crystal display, an LED (Light Emitting Diode) display, or a hologram display. The display unit 22 is connected to the navigation controller 11 and serves to display information such as a map, a route, and/or a facility detected in the searching process. An auxiliary display unit 21 may also be, for example, a CRT, a liquid crystal display, an LED (Light Emitting Diode) display, or a hologram display. The auxiliary display unit 21 is also connected to the navigation controller 11. The auxiliary display unit 21 is used to display information associated with roads, such as a road shape including a curve or the like. Although in the present embodiment, the auxiliary display unit 21 is formed separately from the main display unit 22, the auxiliary display unit 21 may be formed integrally with the display unit 22.

A map screen is displayed on the display unit 22, and the road 26 on which the vehicle is traveling and a current position mark 25, indicating the current position of the vehicle, are displayed on the map screen. In the present embodiment, the navigation system 10 provides, to the driver, information for a road section being approached by the vehicle, such as the shape of the road section, by displaying such information on the auxiliary display unit 21. More specifically, an arrow 27, serving as a road section feature indicating the shape of a road section which the vehicle is approaching, is displayed on the auxiliary display 21 where the shape, direction, curvature, width, and/or color of the arrow 27 is changed depending on the nature of the next road section so that the driver can visually recognize the characteristics of the road section the vehicle is approaching.

In the example shown in FIG. 1, the features of two successive (contiguous) road sections the vehicle is approaching are indicated by respective arrows 27 displayed on the auxiliary display unit 21. In this specific example, the arrows 27 indicate that the first road section (that immediately ahead of the vehicle) curves to the left and the next adjacent road section curves to the right. That is, the two arrows 27 provide information about curves existing ahead of the current position indicated by the mark 25 on the road 26 displayed on the screen of the display unit 22. The information communicated to the driver, such as that associated with the shape of the road section displayed on the auxiliary display unit 21, is changed depending on running conditions such as the vehicle speed. More specifically, the shape of the arrow(s) 27 displayed on the auxiliary display 21 is updated with a predetermined timing before the vehicle enters the indicated road section, wherein the update timing is changed depending on the running conditions such as the vehicle speed.

Figure 2:
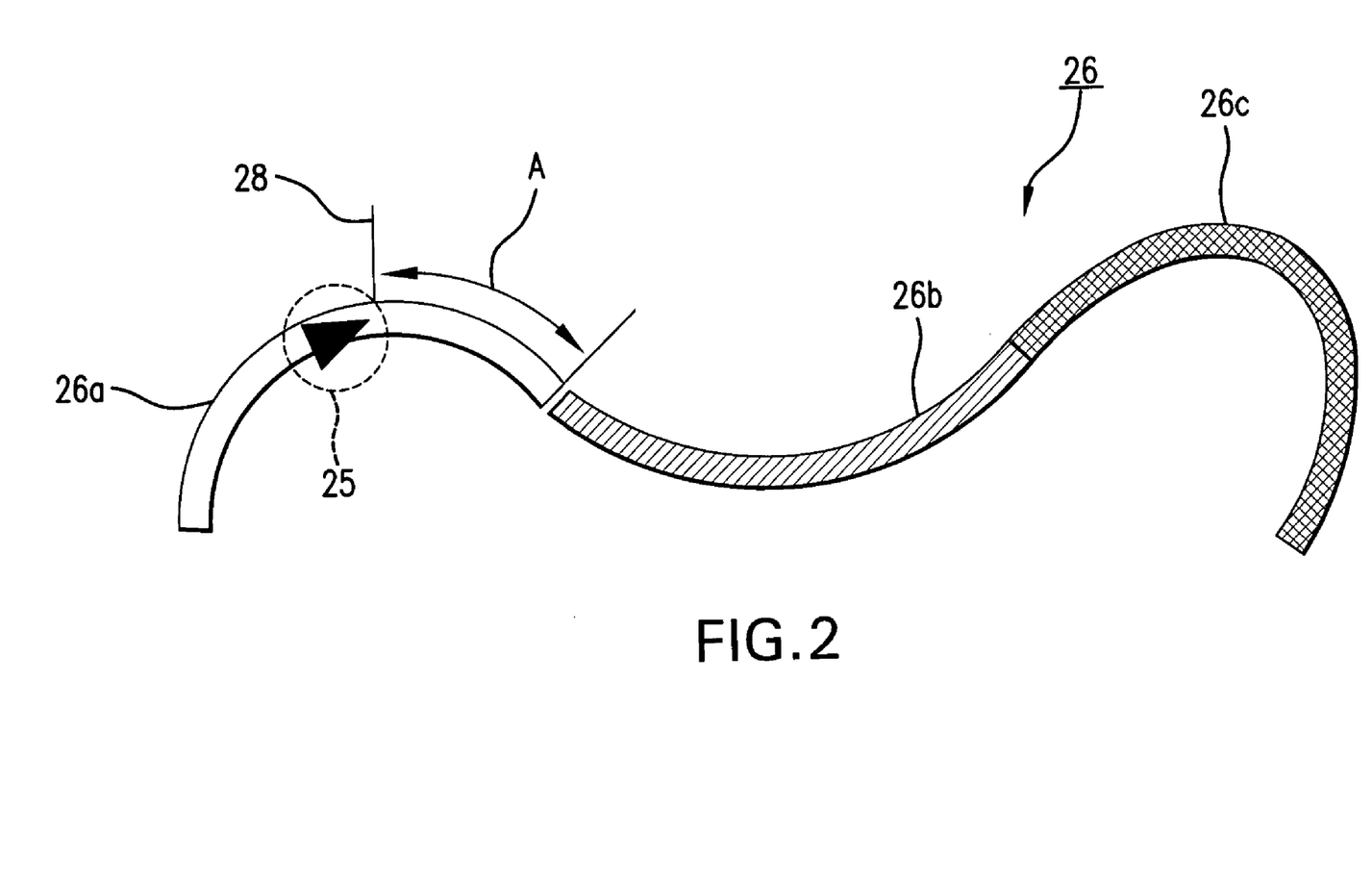
FIG. 2 is a schematic of road sections, illustrating the timing of determination of change in the shape of road sections in accordance with the present invention.
Figure 3:
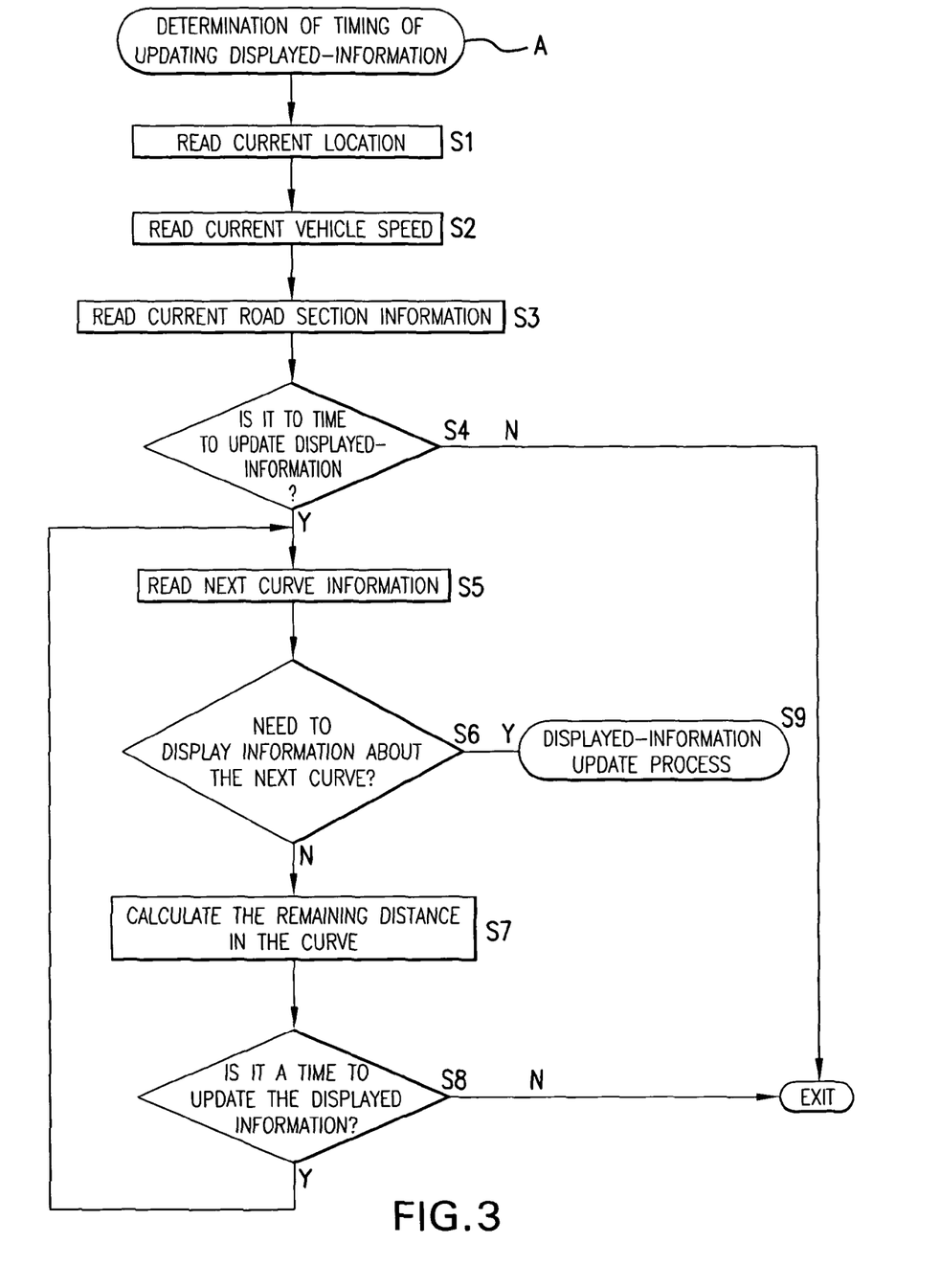
FIG. 3 is a flow chart of a routine for operation of a navigation system according to one embodiment of the present invention.

Next, the operation of the above-described navigation system 10 will be described with reference to FIGS. 2 and 3. FIG. 2 illustrates the manner in which the timing of changing the shape of the road feature is determined in accordance with one embodiment of the present invention and FIG. 3 is a flow chart of the routine for operation of the navigation system according to this first embodiment of the present invention. In the description which follows, by way of example, it is assumed that a determination as to whether to update the information displayed on the auxiliary display unit 21 is dictated by the fact that a road 26 has many, i.e., a plurality of, successive curves, as in the example shown in FIG. 2.

FIG. 2 shows a vehicle as currently traveling a road section (current road section) 26a toward the next road section 26b adjacent to (contiguous with) the current road section 26a. A next successive road section 26c extends from the end point of the next road section 26b. A displayed-information update point 28 corresponds to a displayed-information update timing and is located a particular distance (N m) in advance of the end of the current road section 26a.

First, the navigation controller 11 reads the current position of the vehicle, detected based on the GPS signal received by the GPS receiver 12. In a case in which the navigation controller 11 includes, in addition to the GPS receiver 12, another sensor such as a geomagnetic field sensor, a distance sensor, a beacon sensor, or an altimeter, information detected by such a sensor may also be used in the determination of the current position of the vehicle. In the specific example shown in FIG. 2, the detected current position of the vehicle running on the current road section 26a is indicated by the current position mark 25. The navigation controller 11 then reads the current vehicle speed detected by the vehicle speed sensor 13. Thus, the vehicle speed at the current position indicated by the current position mark 25 shown in FIG. 2 is detected.

Subsequently, the navigation controller 11 reads current curve information, as information associated with the current road section 26a, from the map database 18, based on the current position of the vehicle. Note that in the specific example shown in FIG. 2, the current road section 26a is not a straight road but a curving road, and thus current curve information is read as the information associated with the current road section 26a. The current curve information includes node data including position information for respective nodes included in the current road section 26a, right/left information indicating whether the current road section 26a is curving to the right or left, curve length information indicating whether the length of the current road section 26a is short, medium, or long, curvature information indicating whether the curvature of the current road section 26a is tight, medium, or slight, turning angle information for the current road section 26a, upward/downward gradient information for the current road section 26a, cant information for the cant of the current road section 26a, lane width information for the width of the lanes of the current road section 26a, lane number information for the number of lanes of the current road section 26a, and curvature information for the lengths of lead-in and/or lead-out portions in the form of a clothoid curve of the current road section 26a, and the length of a portion with a constant curvature of the current road section 26a.

Thereafter, the navigation controller 11 determines whether a point in time has been reached for updating the displayed information. More specifically, the navigation controller 11 determines whether it is time to update the displayed information, based on the remaining distance to be traveled on the current road section (current curve) 26a, that is, the distance from the current position to the end of the current road section 26a. In other words, it is determined whether the current position of the vehicle has reached the displayed-information update point 28 located the predetermined distance (N m) before the end of the current road section 26a. If it is determined that the current position of the vehicle has reached the displayed-information update point 28 or if it is determined that the current position of the vehicle is between the displayed-information update point 28 and the end of the current road section 26a, then it is determined that it is a time to update the displayed information. The value of N may be determined such that the displayed-information update point 28 is set to correspond to a point where turning of the steering wheel to the neutral position is to be started, that is, a point where the driver is released from the relatively high tension associated with negotiating a curve.

When the navigation controller 11 determines that it is not a time to update the displayed information, the navigation controller 11 ends the process (exits the routine). On the other hand, if the navigation controller 11 determines that it is a time to update the displayed information, the navigation controller 11 reads next curve information to obtain information associated with next ahead road section 26b from the map database 18, based on the current position of the vehicle. Note that in the example shown in FIG. 2, the next road section 26b is not a straight road section but a curving road section and, therefore, next curve information is read as information associated with the next road section 26b. The next curve information includes node data including position information for the respective nodes included in the next road section 26b, right/left information indicating whether the next road section 26b is curving to the right or left, curve length information indicating whether the length of the next road section 26b is short, medium, or long, curvature information indicating whether the curvature of the next road section 26b is tight, medium, or slight, turning angle information for the next road section 26b, upward/downward gradient information for the next road section 26b, lane width information for the width of lanes in the next road section 26b, lane number information for the number of lanes in the next road section 26b, curvature information for the length of lead-in and/or lead-out portions, in the form of clothoid curves, and the length of a portion with a constant curvature of the next road section 26b.

The navigation controller 11 then determines whether or not to display information associated with the next curve. That is, the navigation controller 11 determines whether to display information associated with the next road section 26b on the auxiliary display unit 21, depending on the detected vehicle speed. More specifically, a threshold value for the vehicle speed is predetermined depending on the value of N and stored in the form of an update timing table (not shown) in the storage means. The navigation controller 11 examines this update timing table to determine whether the current vehicle speed is equal to or greater than the threshold value corresponding to the value of N. If the current vehicle speed is equal to or greater than the threshold value corresponding to the value of N, the navigation controller 11 determines that the information associated with the next road section 26b should be displayed on the auxiliary display unit 21, and executes the displayed-information update routine.

The purpose of the determination described above is to prevent the information associated with the next road section 26b from being displayed on the auxiliary display unit 21 too early. That is, when the vehicle speed is lower than the threshold value corresponding to the value of N, it will take a longer time for the vehicle to reach the next road section 26b relative to time required at the threshold speed. Therefore, if the information associated with the next road section 26b is displayed when the vehicle reaches the displayed-information update point 28, the information associated with the next road section 26b is provided to the driver too early. Accordingly, in the present embodiment, when the vehicle speed is lower than the threshold value corresponding to the value of N, the information associated with the next road section 26b is not displayed, and the necessary information is provided to the driver with an optimum timing.

The threshold value of the vehicle speed, which serves as basis for the determination whether or not to display the information associated with the next road section 26b on the auxiliary display unit 21, may be calculated each time the threshold value becomes necessary for comparison with current vehicle speed, based on the value of N, such that the end of the current road section 26a, that is, the next road section 26b is reached in an optimum time m (sec). In this case, it is not necessary to provide an update timing table in the storage means.

When the vehicle speed is slower than the threshold value corresponding to the value of N, the navigation controller 11 determines that the information associated with the next road section 26b should not be displayed at this time. In this case, the navigation controller 11 calculates the remaining distance to be traveled in the current curve along which the vehicle is to travel at the current vehicle speed. Note that the remaining distance of the current curve for the current vehicle speed is given as the sum of the remaining distance to be traveled within the current road section 26a, that is, the distance from the current position of the vehicle to the end of the current road section 26a, and the length of the next road section 26b, which is the next curve, from its start point to its end point.

Thereafter, the navigation controller 11 determines if the vehicle has reached a point predetermined for updating the displayed information, by checking whether the above-defined remaining distance of the current curve for the current vehicle speed is equal to or less than a predetermined value. If it is determined that the remaining distance of the current curve for the current vehicle speed is greater than the predetermined value, the navigation controller 11 determines that it is not time to update the displayed information, and the navigation controller 11 ends the process.

On the other hand, if the navigation controller 11 determines that the remaining distance of the current curve for the current vehicle speed is equal to or less than the predetermined value, and thus a time for updating the displayed information has been reached, then the navigation controller 11 again reads the next curve information and repeats the process described above. Note that the next curve in this case is the next successive road section 26c, because the remaining distance is not simply defined as the remaining distance of the current road section 26a, but rather as the sum of the remaining distance to be traveled within the current road section 26a and the length of the next road section 26b, as described above.

The determination as to the timing of updating the displayed information is repeatedly executed at predetermined intervals of time (for example, at intervals of 0.1 sec).

The foregoing process will now be described in further detail with reference to the flow chart of FIG. 3.

In step S1, the current position is read.

In step S2, the current vehicle speed is read.

In step S3, the current curve information is read.

In step S4, it is determined whether the current time has reached a predetermined time for updating displayed information. If it is determined that it is a time predetermined for updating displayed information, execution of the routine proceeds to step S5, but otherwise the process is ended.

In step S5, the next curve information is read.

In step S6, it is determined whether or not to display information associated with the next curve. If it is determined that information associated with next curve should be displayed, the routine proceeds to step S9, but otherwise proceeds to step S7.

In step S7, the remaining distance of the current curve for the current vehicle speed is calculated.

In step S8, it is determined whether or not a time predetermined for updating the displayed information has been reached. If it is determined that it is a time to update the displayed information, the routine returns to step S5, but otherwise the process is ended.

In step S9, the displayed-information updating routine is executed.

In the displayed-information updating routine, the shape of the road section displayed on the auxiliary display unit 21 is determined as illustrated in FIGS. 4-8. First, the navigation controller 11 reads the current vehicle speed to acquire the vehicle speed detected by the vehicle speed sensor 13. The navigation controller 11 then reads the next curve information to acquire the information associated with the next road section 26b from the map database 18, based on the current position of the vehicle. The navigation controller 11 then acquires static road information from the next curve information, that is, from the information associated with the next road section 26b. The static road information includes, for example, right/left information indicating whether the next road section 26b is curving to the right or left, curve length information indicating whether the length of the next road section 26b is short, medium, or long, curvature information indicating whether the curvature of the next road section 26b is tight, medium, or slight, and/or turning angle information for the next road section 26b.

The navigation controller 11 then calculates the lateral acceleration that will occur if the vehicle turns the next curve while maintaining the present vehicle speed. More specifically, the lateral turning acceleration G that will occur in traveling the next road section 26b, while maintaining the current vehicle speed, is calculated in accordance with the following equation (1).

$$G = V^2/R \qquad (1)$$

wherein V is the vehicle speed, and R is the radius of curvature of the next road section 26b. Note that the radius of curvature R is assumed to be constant.

It is known that when the lateral turning acceleration G is equal to or greater than 0.5 (G), the vehicle is likely to deviate from the proper lane or alignment within a curve. However, in practice, when the vehicle runs at the speed V that causes the lateral turning acceleration to be equal to 0.5 (G) according to equation (1), the width of the road allows the vehicle to deviate somewhat from the course of radius R, by following a modified (adjusted) radius of curvature greater than R, and thus the vehicle does not actually improperly deviate from the course of the curve. Therefore, the vehicle speed V can be regarded as appropriate when the vehicle speed V produces a lateral turning acceleration equal to 0.5 (G) according to equation (1).

Figure 6A:
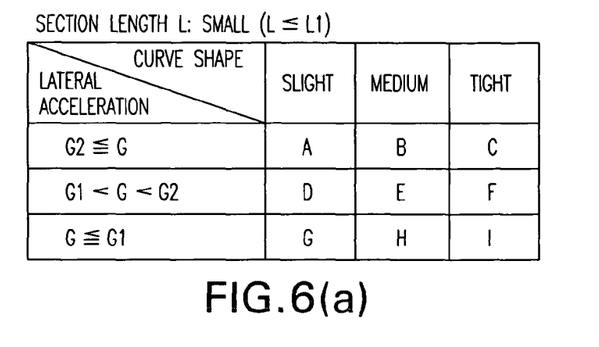
Figure 6B:
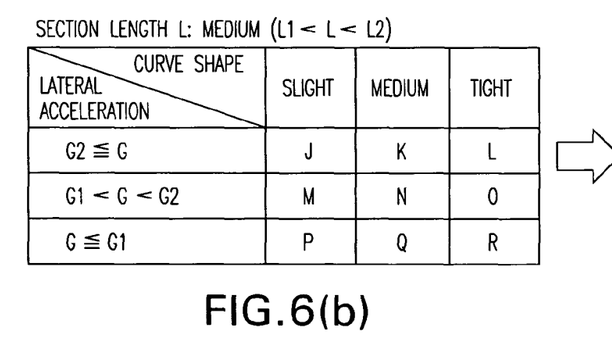
Figure 6C:
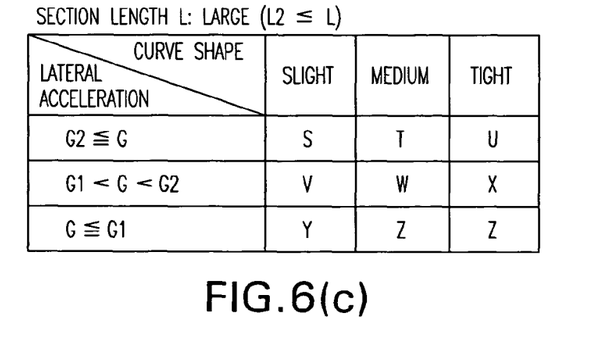
Figure 6D:
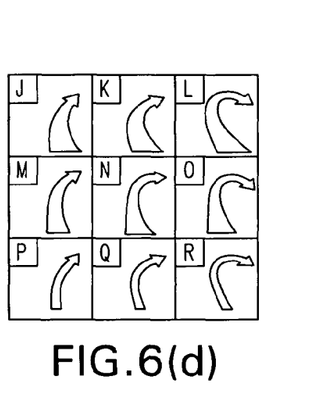

The navigation controller 11 determines the shape of the arrow according to the road information and the lateral acceleration by referring to an arrow shape table, e.g., FIG. 6(d). More specifically, the navigation controller 11 examines the arrow shape table to detect a correct arrow shape corresponding to the static road information associated with the next road section 26b and the calculated lateral turning acceleration, and the navigation controller 11 employs the detected arrow shape as the shape of the road section displayed on the auxiliary display 21 unit.

Figure 4:
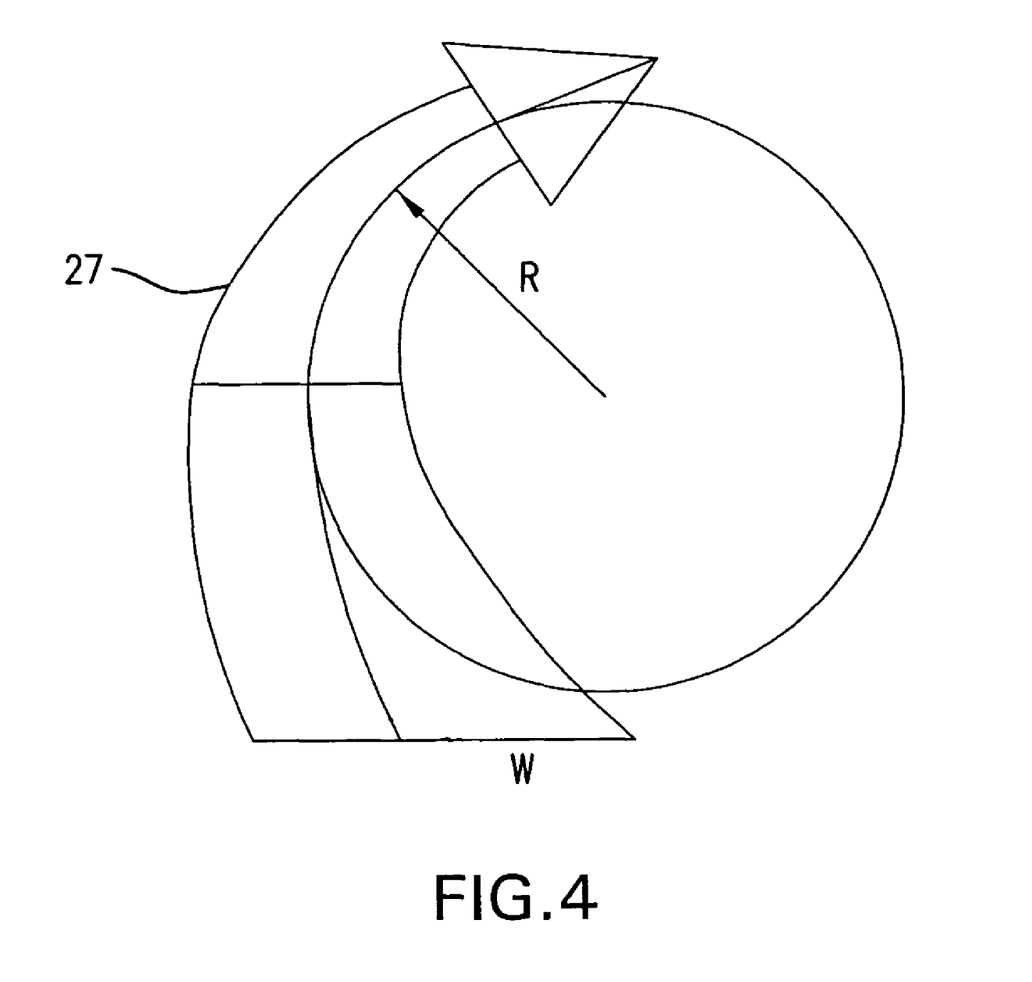
FIG. 4 illustrates the manner in which the shape of a road section is determined in accordance with an embodiment of the present invention.

As shown in FIG. 4, the shape of the arrow 27 used as the road section feature is properly determined in terms of the direction of the curve, the width W of the main part of the arrow, and the radius of curvature R indicating the degree of curving, so that the driver can visually recognize the shape and course of the road section being approached by the vehicle. Note that the direction of curve, the width W, and the radius of curvature R are determined based on the static road information associated with the next road section 26b read from the map database 18. Furthermore, the width W and the radius of curvature R are respectively multiplied by modification factors w and r determined depending on the lateral turning acceleration G, and the resultant adjusted values for W and R are employed as final values of the width and the radius of curvature of the arrow 27 as shown in FIG. 4.

Figure 5:
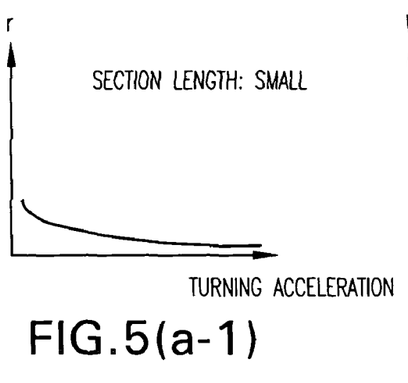

The modification factors r and w may be determined according to the tables shown in FIGS. 5(a-1)-5(c-2). These tables are produced in advance and stored in the storage means. FIG. 5(a-1) shows the modification factor r (vertical axis) as a function of the lateral turning acceleration G (horizontal axis), for road sections whose length is relatively short. FIG. 5(a-2) is a graph of the modification factor w (vertical axis) versus the lateral turning acceleration G (horizontal axis), for road sections whose length is relatively short. FIG. 5(b-1) shows the modification factor r (vertical axis) as a function of the lateral turning acceleration G (horizontal axis), for road sections whose length is relatively "medium". FIG. 5(b-2) gives the modification factor w (vertical axis) as a function of the lateral turning acceleration G (horizontal axis), for road sections whose length is relatively "medium". FIG. 5(c-1) shows the modification factor r (vertical axis) as a function of the lateral turning acceleration G (horizontal axis), for road sections whose length is relatively long. FIG. 5(c-2) shows the modification factor w (vertical axis) as a function of the lateral turning acceleration G (horizontal axis), for road sections whose length is relatively long.

In the arrow shape table, various shapes of the arrow 27 may be drawn in advance and graphics data therefor may be stored as shown in FIG. 6(d), instead of utilization of a relationship between the modification factor r or w and the lateral turning acceleration G, as shown in FIGS. 5(a-1)-5(c-2). In the example of the arrow shape table shown in FIGS. 6(a) to 6(c), shapes A to Z for the arrow 27 are determined depending on the curvature and the lateral turning acceleration G, and these shapes A to Z are recorded in the form of graphics data in table format.

FIG. 6(a) shows a table used to select an arrow shape for road sections with a short length. More specifically, for road sections with length L less than a predetermined threshold value L1, the table defines the arrow shape types in accordance with whether the curvature is slight, medium, or tight and whether the lateral turning acceleration G is in a range equal to or greater than a threshold value G2 (G2≦G), a range from a threshold value G1 to the threshold value G2 (G1<G<G2), or a range equal to or smaller than the threshold value G1 (G≦G1). The threshold values G1 and G2 are respectively set, for example, to 0.1 (G) and 0.5 (G). For respective combinations of ranges in terms of the curvature and the lateral turning acceleration G, shapes A to I are assigned for the arrow 27, and the corresponding graphics data therefor is stored.

FIG. 6(b) shows a table used to select an arrow shape for road sections of medium length. More specifically, for road sections with length L in a range from L1 to L2 (L1<L<L2), the table defines the arrow shapes depending on whether the curvature is slight, medium, or tight and also whether the lateral turning acceleration G is in a range equal to greater than G2 (G2≦G), a range from a threshold value G1 to the threshold value G2 (G1<G<G2), or a range equal to or smaller than the threshold value G1 (G≦G1). L2 is set in advance as a predetermined value. For respective combinations of ranges in terms of the curvature and the lateral turning acceleration G, shapes J to R are assigned for the arrow 27, and the corresponding graphics data is stored.

FIG. 6(c) shows a table used to select an arrow shape for road sections with a long length. More specifically, for road sections with length L equal to or greater than the predetermined threshold value L2, the table defines the arrow shape types depending on whether the curvature is slight, medium, or tight and whether the lateral turning acceleration G is in a range equal to greater than G2 (G2≦G), a range from a threshold value G1 to the threshold value G2 (G1<G<G2), or a range equal to or smaller than the threshold value G1 (G≦G1). For respective combinations of ranges in terms of the curvature and the lateral turning acceleration G, shapes S to Z are assigned for the arrow 27, and graphics data therefor is stored.

FIG. 6(d) shows examples of shapes of the arrow 27. These shapes are drawn in advance and the corresponding graphics data therefor is stored. The shapes J to R of the arrow 27 shown in FIG. 6(d) respectively correspond to the shapes J to R defined in FIG. 6(b). As can be seen from FIG. 6(d), with the lateral turning acceleration G, the width W of the arrow 27 increases and the radius of curvature R thereof decreases. That is, for a given (same) curve, the width W of the arrow 27 increases with the vehicle speed for emphasis, and the radius of curvature R is reduced with the vehicle speed so that the driver is made aware that the vehicle is now approaching a tight curve.

Figure 7A:
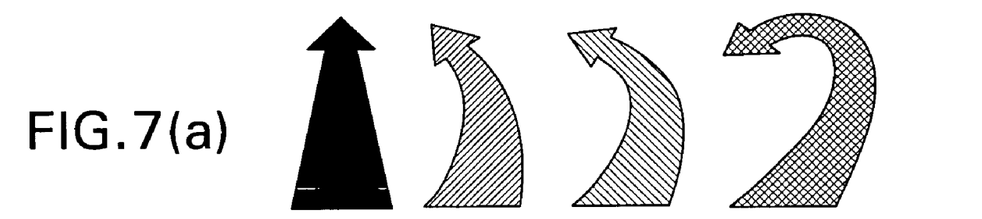

In the present embodiment, the shape of the arrow 27 is also changed depending on factors that influence the psychological state of the driver, such as wind noise, engine noise, or a similar ambient sound, factors that influence the stability of the vehicle, such as the height of the vehicle, factors that influence the ease of driving the vehicle, such as a change in ambient brightness, factors that influence the fatigue of the driver, such as driving duration, and factors that influence the grip of the vehicle tires on the road surface, such as dry weather, rain, snow, and ice. To this end, the shape of the arrow 27 is determined according to an arrow shape table such as that shown in one of FIGS. 7(a) to 7(d). FIG. 7(a) shows a first arrow shape table. Depending on the factors mentioned above, one of the first to third arrow shape tables is selected, and the shape of the arrow 27 is determined according to the selected table.

Figure 7B:
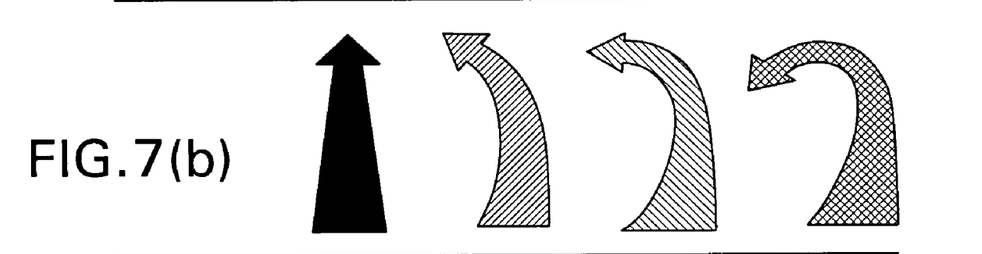
Figure 7C:
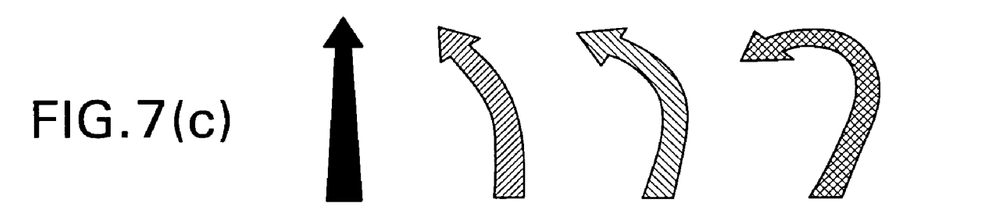

When an ambient sound that influences the psychological state of the driver, such as wind noise or engine noise, is a concern, for example, the third table is selected when the ambient sound level is less than 50 (dB), and the shape of the arrow 27 is determined according to the third table. When the ambient sound level is equal to or greater than 50 (dB) and less than 100 (dB), the second table is selected, and the shape of the arrow 27 is determined according to the second table. When the ambient sound level is equal to or greater than 100 (dB), the first table is selected, and the shape of the arrow 27 is determined according to the first table.

When a factor such as the vehicle height that influences the stability of the vehicle is a concern, for example, the first table is selected when the vehicle height is greater than the standard vehicle height by 10 (mm) or more, and the shape of the arrow 27 is determined according to the first table. When the difference of the vehicle height from the standard vehicle height is less than 10 (mm), the second table is selected, and the shape of the arrow 27 is determined according to the second table.

When a factor that influences the ease of driving the vehicle, such as a change in ambient brightness, is a concern, for example, the first table is selected when the ambient brightness is at a level that requires the headlights to be ON, and the shape of the arrow 27 is determined according to the first table. When the ambient brightness is at a level that does not require use of headlights, the second table is selected, and the shape of the arrow 27 is determined according to the second table.

When a factor such as driving for a duration that produces fatigue of the driver is a concern, for example, the third table is selected when the driving duration is less than 1 hour, and the shape of the arrow 27 is determined according to the third table. When the driving duration is equal to or greater than 1 hour but less than 2 hours, the second table is selected, and the shape of the arrow 27 is determined according to the second table. When the driving duration is equal to or greater than 2 hours, the first table is selected, and the shape of the arrow 27 is determined according to the first table.

When a factor that influences the grip of the vehicle tires on the road surface, such as dryness, rain, snow, or ice, is a concern, for example, the third table is selected when the ambient temperature that determines the road surface condition is equal to or higher than 5°, and the shape of the arrow 27 is determined according to the third table. When the ambient temperature is less than 5° but equal to or greater than 0°, the second table is selected, and the shape of the arrow 27 is determined according to the second table. When the ambient temperature is less than 0°, there is a possibility of freezing on the road surface and, in this case, the first table is selected and the shape of the arrow 27 is determined according to the first table.

Figure 8:
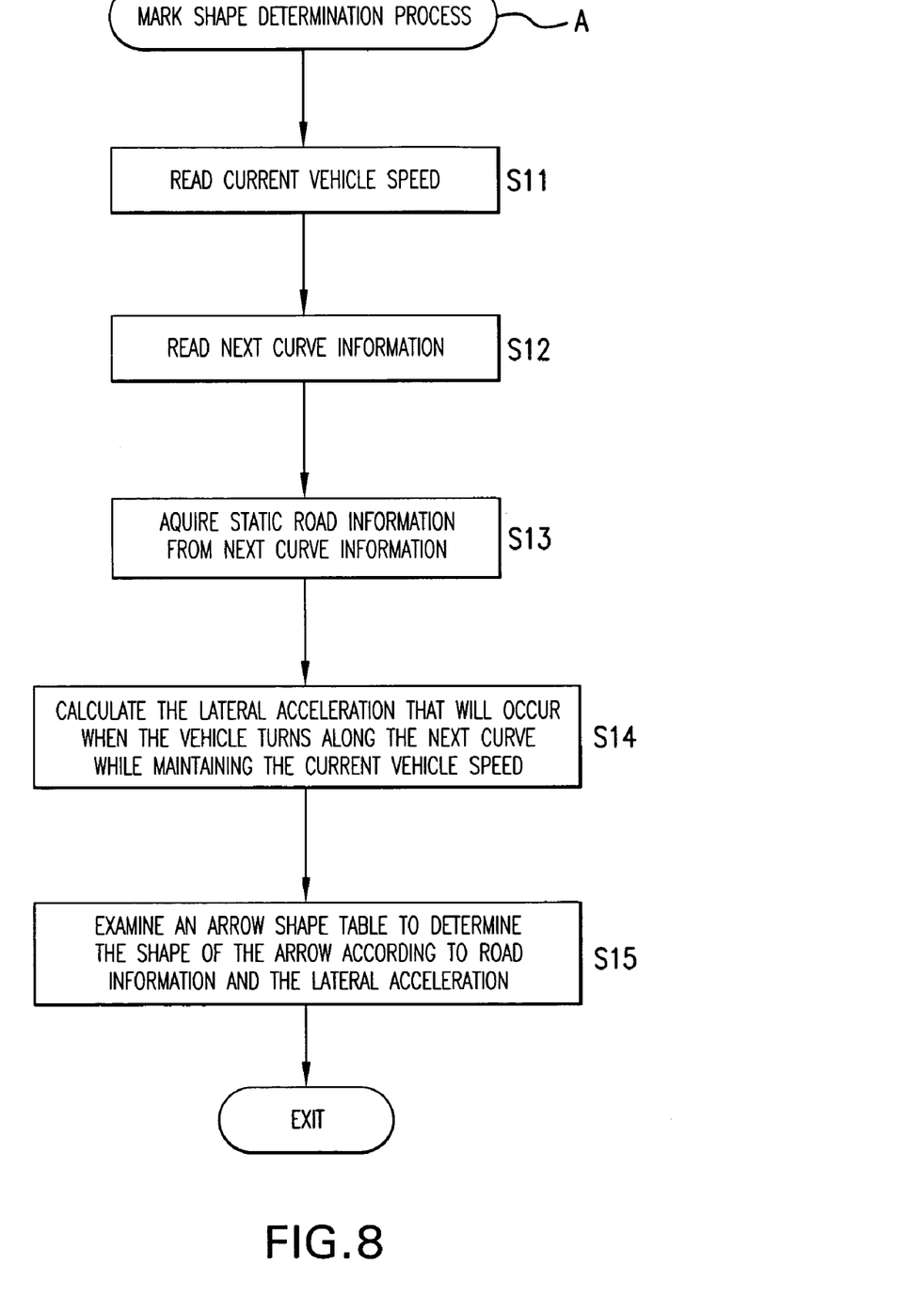
FIG. 8 is a flow chart of a routine for determining the shape of a road section according to another embodiment of the present invention.

Now, operation in accordance with the flow chart of FIG. 8 will be described.

In step S11, the current vehicle speed is read.

In step S12, the next curve information is read.

In step S13, static road information is acquired from the next curve information.

In step S14, the lateral acceleration that will occur when the vehicle turns the next curve while maintaining the current vehicle speed is calculated.

In step S15, the shape of the arrow is determined depending on the road condition and the calculated lateral acceleration by reference to an arrow shape table.

In the present embodiment, as described above, the shape of a road section currently being approached by the vehicle is determined according to the map data and the vehicle speed, and the determined shape of the road section is displayed on the screen of the display unit. That is, the direction, the width, and the curvature of the arrow 27 indicating a feature, such as the shape of the road section being approached by the vehicle are changed depending on a feature of concern (at least one characteristic) of that road section and the vehicle speed. This makes it possible for the driver to visually recognize the feature of concern, such as the shape of that road section being approached by the vehicle, thereby allowing the driver to appropriately change the vehicle speed and steering in accordance with the feature of the road section illustrated by the display. In this manner the driver is aided in properly driving the vehicle in a manner appropriate for the road feature of concern. For example, if the vehicle speed increases, the width W of the main part of the arrow 27 is increased such that the perspective is emphasized, and the radius of curvature R of the arrow 27 is reduced such that the sharpness of the curve is emphasized, to make the driver aware that the vehicle is approaching a tight curve. This allows the driver to intuitively understand the need for reducing the vehicle speed and understand that quick control of the steering is needed.

In the present embodiment, information such as the direction of the curve, the length of the curve, the degree of the curve (radius of curvature) of the road section being approached by the vehicle is provided to the driver in a direct manner which is less confusing than a case wherein many items of information are presented to the driver at the same time, by display of arrow 27 whose shape is changed so that the driver can intuitively grasp the road feature or condition of concern, thereby aiding the driver in making correct decisions in driving the vehicle.

Because the shape of the arrow 27 is changed when the vehicle reaches the displayed-information update point 28, information indicating the road feature or condition of a road section is presented to the driver with an appropriate timing that allows the driver to grasp the information and to appropriately act in view thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system for a vehicle comprising:
(a) a display unit for displaying information;
(b) a vehicle speed sensor for detecting a vehicle speed; and
(c) a controller for determining a shape for a road section being approached by the vehicle from a shape table with a predetermined correlation between different curve shapes and different values for lateral turning acceleration, based on a curvature of the road section acquired from map data, for calculating lateral turning acceleration based on the detected vehicle speed and the map data, for applying the calculated lateral turning acceleration to the shape table to identify a curve shape associated with the calculated lateral turning acceleration and for displaying the curve shape identified from the table on the display unit; and
wherein, responsive to an increase in the detected speed, the degree of curvature of the curve shape displayed for the road is increased.

2. A navigation system according to claim 1, wherein the controller changes timing of updating of the display of the shape of the road section, depending on the detected vehicle speed.

3. A navigation system according to claim 1, wherein the curve shapes are arrows differing with respect to the direction of the arrow, the width of the arrow, and the curvature of the arrow.

4. A navigation system according to claim 2, wherein the curve shapes are arrows differing with respect to the direction of the arrow, the width of the arrow, and the curvature of the arrow.

5. A navigation system according to claim 3, wherein the display unit includes a main display unit for displaying a map and an auxiliary display for displaying the arrow.

6. A navigation system according to claim 4, wherein the display unit includes a main display unit for displaying a map and an auxiliary display for displaying the arrow.

7. A navigation system according to claim 1, wherein, as the detected vehicle speed increases, the controller increases the width and the degree of curving of the displayed curve shape to emphasize the sharpness of the curve.

8. A navigation system according to claim 3, wherein, as the detected vehicle speed increases, the controller increases the width and degree of curving of the displayed arrow to emphasize the sharpness of the curve.

9. A navigation system according to claim 1, wherein:
the shape table has a plurality of ranges of curvature of road sections correlated with a plurality of ranges of lateral turning acceleration to provide combinations of a range of curvature of road section and a range of lateral turning acceleration,
each combination of a range for curvature of road section and a range for lateral turning acceleration is correlated with one of the different curve shapes for display, and
wherein the controller applies a curvature of the road section being approached by the vehicle, acquired from map data, and a lateral turning acceleration, calculated from the detected vehicle speed and the map data, to the shape table to determine the curve shape to be displayed on the display unit.

10. The navigation system for a vehicle according to claim 9, wherein radius of curvature of curve shapes in the shape table becomes larger as the curvature of the road section being approached by the vehicle become tighter and as the lateral turning acceleration becomes larger.

11. A method for providing navigational guidance to the driver of a vehicle comprising:
   (a) storing a shape table with a predetermined correlation between different curve shapes and different values for lateral turning acceleration, as electronic data in computer readable form;
   (b) detecting vehicle speed;
   (c) calculating lateral turning acceleration based on detected vehicle speed;
   (d) reading, from the map data, information for a road section being approached by the vehicle;
   (e) determining a curve shape to be displayed for the road section being approached by the vehicle by applying the calculated lateral turning acceleration to the shape table to identify a curve shape associated with the calculated lateral turning acceleration; and
   (f) displaying the curve shape identified from the shape table
   wherein, responsive to an increase in the detected speed, the degree of curvature of the curve shape displayed for the road is increased.

12. A method according to claim 11, further comprising changing timing of updating of the display of the shape of the road section, responsive to changes in the detected vehicle speed.

13. A method according to claim 11, wherein the shape of the road section is indicated by displaying an arrow and wherein the direction of the arrow, the width of the arrow, and the curvature of the arrow represent the shape of the road section.

14. A method according to claim 11, wherein, as the detected vehicle speed increases, the width of the displayed curve shape is increased and the degree of curving of the displayed curve shape is increased to emphasize the sharpness of the curve.

15. A method according to claim 13, wherein, as the detected vehicle speed increases, the width of the displayed arrow is increased and the degree of curving of the displayed arrow is increased to emphasize the sharpness of the curve.

16. A method according to claim 11:
   wherein the calculating of lateral turning acceleration is based on the detected vehicle speed and on the map data;
   wherein the determining of the shape to be displayed is by reference to a shape table;
   wherein the shape table has a plurality of ranges of curvature of road sections correlated with a plurality of ranges of lateral turning acceleration to provide combinations of a range of curvature of road section and a range of lateral turning acceleration,
   wherein, in the shape table, each combination of a range for curvature of road section and a range for lateral turning acceleration is correlated with a different curve shape for display; and
   wherein the controller applies a curvature of the road section being approached by the vehicle, acquired from map data, and a lateral turning acceleration, calculated from the detected vehicle speed and the map data, to the shape table to determine the curve shape to be displayed on the display unit.

17. A method according to claim 16, wherein radius of curvature of curve shapes in the shape table becomes larger as the curvature of the road section being approached by the vehicle become tighter and as the lateral turning acceleration becomes larger.

* * * * *